(12) United States Patent
Lee

(10) Patent No.: US 10,506,095 B2
(45) Date of Patent: Dec. 10, 2019

(54) METHOD FOR PROVIDING GUIDANCE DURING A CALL WAITING STATE

(71) Applicant: Jaehun Lee, Seoul (KR)

(72) Inventor: Jaehun Lee, Seoul (KR)

( * ) Notice: Subject to any disclaimer, the term of this patent is extended or adjusted under 35 U.S.C. 154(b) by 0 days.

(21) Appl. No.: 15/769,198

(22) PCT Filed: Oct. 18, 2016

(86) PCT No.: PCT/KR2016/011679
§ 371 (c)(1),
(2) Date: Jul. 3, 2018

(87) PCT Pub. No.: WO2017/069481
PCT Pub. Date: Apr. 27, 2017

(65) Prior Publication Data
US 2018/0309870 A1    Oct. 25, 2018

(30) Foreign Application Priority Data

Oct. 19, 2015 (KR) ......................... 10-2015-0145039
Sep. 9, 2016 (KR) ......................... 10-2016-0116388

(51) Int. Cl.
*H04M 1/725* (2006.01)
*G06F 3/0482* (2013.01)
(Continued)

(52) U.S. Cl.
CPC ...... *H04M 1/72583* (2013.01); *G06F 3/0482* (2013.01); *G06F 3/04883* (2013.01);
(Continued)

(58) Field of Classification Search
CPC ........... H04M 1/72583; H04M 3/4285; H04M 1/72547; H04M 2203/256;
(Continued)

(56) References Cited

U.S. PATENT DOCUMENTS 8,284,927 B1 * 10/2012 Chu .................... H04M 3/4285
379/162
9,125,029 B2    9/2015 Kim et al.
(Continued)

FOREIGN PATENT DOCUMENTS

JP    2003-152827 A    5/2003
KR    10-0754581 B1    9/2007
(Continued)

OTHER PUBLICATIONS

International Search Report (ISR) dated Feb. 13, 2017 in PCT/KR2016/011679, 3 pgs.
(Continued)

*Primary Examiner* — Brandon J Miller
(74) *Attorney, Agent, or Firm* — Ichthus International Law PLLC

(57) ABSTRACT

The present invention relates to a method, for providing guidance during a call waiting state, comprising the steps of: a gesture recognition unit of a user device recognizing a call waiting gesture while a call request signal is being received; when the call waiting gesture is recognized, a call acceptance control unit of the user device executing a switch to a call acceptance state with respect to the call request signal received by the user device; a call waiting control unit of the user device switched to the call acceptance state stopping an operation of a speaker unit or a microphone unit of the user device and executing a switch to a call waiting state; and, if the gesture recognition unit recognizes a call switching gesture, activating the operation of the speaker unit or the microphone unit.

7 Claims, 11 Drawing Sheets

(51) Int. Cl.
 G06F 3/0488 (2013.01)
 H04M 3/428 (2006.01)
(52) U.S. Cl.
 CPC ... *H04M 1/72522* (2013.01); *H04M 1/72547* (2013.01); *H04M 3/4285* (2013.01); *H04M 2203/256* (2013.01); *H04M 2250/62* (2013.01); *H04M 2250/66* (2013.01)
(58) Field of Classification Search
 CPC .......... H04M 2250/66; H04M 2250/62; G06F 3/04883; G06F 3/0482
 See application file for complete search history.

(56) References Cited

U.S. PATENT DOCUMENTS

| | | | |
|---|---|---|---|
| 2002/0137493 A1* | 9/2002 | Dutta | H04M 1/663 455/414.1 |
| 2004/0063472 A1* | 4/2004 | Shimizu | H04M 1/6083 455/569.1 |
| 2005/0152531 A1* | 7/2005 | Hamilton, II | H04M 3/4285 379/266.01 |
| 2008/0132253 A1 | 6/2008 | Cho et al. | |
| 2011/0111735 A1* | 5/2011 | Pietrow | H04M 1/642 455/414.1 |
| 2014/0155039 A1 | 6/2014 | Kim et al. | |
| 2015/0341760 A1 | 11/2015 | Kim et al. | |
| 2016/0191702 A1* | 6/2016 | Gabbai | H04M 3/4286 379/266.06 |

FOREIGN PATENT DOCUMENTS

| | | |
|---|---|---|
| KR | 10-2013-0016780 A | 2/2013 |
| KR | 10-2014-0071831 A | 6/2014 |

OTHER PUBLICATIONS

Written Opinion of the International Searching Authority (WOISA) dated Feb. 13, 2017 in PCT/KR2016/011679, 5 pgs.

* cited by examiner

METHOD FOR PROVIDING GUIDANCE DURING A CALL WAITING STATE

CROSS-REFERENCE TO RELATED PATENT APPLICATION(S)

This application is the U.S. National Stage Entry of the International Application No. PCT/KR2016/011679, filed on Oct. 18, 2016, claiming priority to Korean Patent Application Nos. 10-2015-0145039, filed on Oct. 19, 2015, and 10-2016-0116388, filed on Sep. 9, 2016, the entire contents of which are incorporated herein by reference in their entireties.

TECHNICAL FIELD

The present invention relates to a method for providing guidance during a call waiting state, in particular, to a method for providing guidance during the call waiting state, and at the same time establishing a call connection and enabling to stop an operation of a speaker unit or a microphone unit.

BACKGROUND ART

When using a mobile phone, sometimes when a person receives an incoming telephone call that he/she desires to take, but he/she is in a conference room or a library that is a quiet place, he/she needs to either ask for excuse from other people and take the call, or move to a place in which he/she can take the telephone call and talk with a caller. This is a case that the receiving party desires but cannot receive the telephone call immediately, and that the receiving party can receive the telephone call if given a short amount of time to move to a place where he/she can take the telephone call without bothering others.

On the one hand, when the receiving party goes out of the conference room or library to receive the telephone call, it is usually an important call that may require immediate attention of the receiving party. In such a case, while moving to a place where the telephone call may be received, the telephone call may get disconnected, and as a result the receiving party may have trouble or inconvenience of calling back the caller or calling party. For example, when a telephone call is received, sending a text message such as "I am in a meeting. I will contact you" or "I am driving" presumes a termination of the telephone call. When such messages are sent out, the telephone call is automatically disconnected, and thus the receiving party cannot avoid having the inconvenience of calling back the calling party later.

In contrast, if the telephone call is received out of concerns, others in the conference room or library may be inconvenienced in a quiet place because of noises of a speaker unit of a mobile phone of the receiving party. Also, certain conversations that need to be carried out in private or in a secure place may be leaked to others.

DETAILED DESCRIPTION OF THE INVENTION

Technical Problem to be Solved

In order to solve the above problems, a method for providing guidance during a call waiting state according to an embodiment of the present invention is provided as follows. When you receive a call signal and want to establish a call with a calling party or a caller but you need a time to prepare for the call, you may take a call signal to make sure that the caller does not hang up, and send a message to the calling party, asking him/her to wait for a short time so that he/she does not hang up. On the one hand, in an aspect of the present invention, the calling party who is waiting for a connection to be established for a telephone call with the receiving party may watch useful advertisements for him/her for a short period of time, useful living information provided by a provider, or self-introduction, humor, and news sent by the call receiving party. It is intended to provide a method for allowing the receiving party to move to a place in which a telephone conversation can be carried out while making a good use of such a short time, and naturally establishing a telephone conversation with the calling party when the receiving party is in the place for the telephone call.

The aspects of the present invention are not limited to those mentioned herein, it is possible to have yet other aspects that will be clearly understood by those skilled in the art from the following description.

Means to Solve the Problem

A method to provide guidance during the call waiting state according to an aspect of the present invention may include steps of recognizing by a gesture recognition unit a call waiting gesture on a user device while a call request signal for a call is received; when the call waiting gesture is recognized, by a telephone call admission control unit of the user device, switching to a state in which a user of the user device can accept the call based on the received call request signal; switching by a call waiting control unit of the user device to a call acceptance state, stopping an operation of a speaker unit or a microphone unit of the user device and switching to a call waiting state; and activating the operation of the speaker unit or the microphone unit of the user device when the gesture recognition unit recognizes a current conversion gesture.

In addition, the step of recognizing the call waiting state may include: displaying at least one information allowing a selection of a time for the call waiting via a display unit of the user device after the gesture recognition unit recognizes the call waiting gesture; recognizing where in the gesture recognition unit recognizes the gesture selection time for the call waiting time selection information; recognizing and controlling the call waiting control section to transmit content information during the time in which the user device is placed in a selected call waiting state by the time selection gesture unit via a transmission and reception unit of the user device.

Moreover, the step of activating the operation of the speaker unit or the microphone unit may further include blocking transmission of the content information.

Moreover, the user gesture may include a dragging or touching by the user on a touch display unit of the user device.

Moreover, the transitioning to the call waiting state through the transmission and reception unit of the user device may comprise transmitting a content information request signal to a service server.

Moreover, the content information may be one of pre-stored information in a data storage unit of the user device.

Moreover, the content information may be advertisement, living information or user-inputted information.

Moreover, the content information may be text information, audio information or image information.

According to an aspect of the present invention, a call waiting content selection method is provided as follows. The method may include: receiving a call waiting signal through a transmission and reception unit of a user device; recognizing a call waiting menu selection gesture by a gesture recognition unit of the user device; when the call waiting menu selection gesture is recognized, transmitting the call waiting menu selection information; receiving call waiting content by the transmission and reception unit; by a content control unit of the user device, stopping an operation of a microphone unit and reproducing the call waiting content through a speaker unit or a display unit of the user device; and controlling a content control unit of the user device to activate the operation of the microphone unit and stop the operation of the speaker unit or the display unit and to output call information when the transmission and reception unit receives call start information.

In addition, the step of receiving the call waiting signal may include displaying content selection information allowing a selection of at least one call waiting menu through the display unit of the user device after the transmission and reception unit receives the call waiting signal; recognizing, by the gesture recognition unit, a content selection gesture for the content selection information; and controlling the content control unit to transmit the content request information selected by the content selection gesture through the transmission and reception unit.

Moreover, the call waiting content may be classified information stored in advance such as advertisement, lifestyle information, or user inputted information that is sent to the device.

Moreover, the content information may be text information, audio information or image information.

Effects of the Invention

A method for providing guidance during a call waiting state according to an embodiment of the present invention is as follows. When a person receives an incoming call signal and wants to establish a call with a calling party, but the person needs a time to prepare for the call, the person can take the incoming call signal and make sure the call never gets disconnected, by sending a message to the calling party and asking him/her to wait so that he/she does not hang up. On the one hand, the calling party waiting for the telephone call to be established can watch useful advertisements sent for the calling party for a short period of time, useful living information provided by the call receiving party, or self-introduction, humor, and news sent by the call receiving party. In an aspect, it is intended to provide a method for allowing a recipient or the call receiving party to move to a place in which a telephone call conversation can be carried out while making a good use of such short time available, and to carry the telephone call conversation with the caller/calling party after the call receiving party move and situate in the place.

According to the embodiment of the present invention, at the call receiving party side, it is possible to reduce the time, effort, and cost due to unnecessary re-dialing for the telephone call conversation after disconnection. And, further, it can give the calling party an impression of the call receiving party that the call receiving party is "the person who always get the calls when I call."

In addition, at the calling side, useful information can be obtained by providing advertisement or public interest contents (certain information regarding the living in a city, living information, etc.) during the call waiting time.

Moreover, according to an embodiment of the present invention, for an advertiser, it is possible to have a good opportunity for the advertiser to promote products while servicing the calling party.

Effects of the present invention are not limited to those mentioned herein, and other further effects not mentioned herein may be clearly understood by those skilled in the art based on the following description of the present invention.

DESCRIPTION OF EXAMPLE EMBODIMENTS

Figure 1:
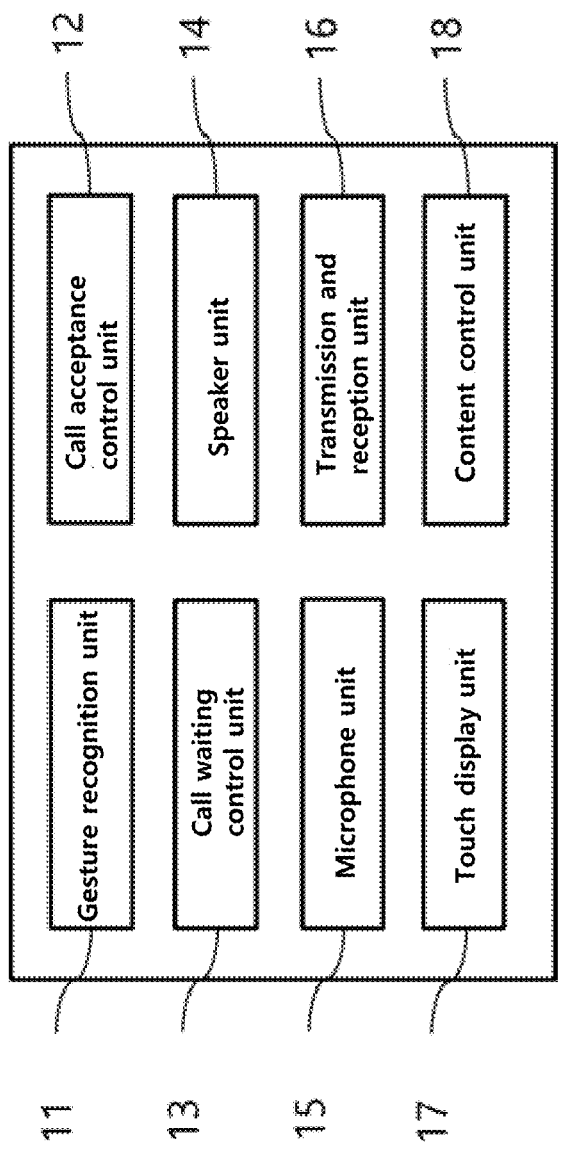
FIG. 1 is a system block diagram of a user device for a method for providing guidance during a call waiting state according to an embodiment of the present invention.

The purpose and effects of the present invention, and the technical components for achieving them will be apparent to one skilled in the art, in view of the detailed descriptions of example embodiments and the accompanying drawings hereto. In describing the present invention, certain detailed explanation will be omitted when it is determined that the description that provides its notice function or elements renders the explanation of the present invention unnecessarily unclear. And the terms described hereinafter, as the defined terms in consideration of the present invention, may be different in accordance with the customary practices or the intent of a user or operator.

The present invention is not limited to the embodiments described herein, but it can be implemented in various different forms. The example embodiments of the present invention described herein are provided so as to inform one skilled in the art of the present invention of the scope of the invention, as well as for complete illustrative purposes. As such, the present invention is only limited by the scope of the claims and its determination of the claim scope should be based on the entire content of the present specification.

In the specification herein, when a part contains a component, the word "include" or "possess" is used, and it means to include other components, unless it is expressly written to mean the contrary. Moreover, the terms as used herein such as " . . . unit," " . . . apparatus," " . . . device,", " . . . part," or " . . . module," etc. shall mean a unit for performing at least one function or operation, which may be implemented in software, hardware, or a combination of hardware and software.

On the one hand, in example embodiments of the present invention described herein, components, functional elements, function blocks, or methods may include at least one or more components below, and each may be implemented using various devices or mechanical elements such as electronic circuits, integrated circuits, ASIC (Application Specific Integrated Circuit), etc. for electrical, electronic, and mechanical functions, each of which may be implemented as separate elements or in combination of at least two elements.

Moreover, each block shown in the attached block diagrams and a combination of steps shown in a flowchart may be implemented by computer program instructions. The computer program instructions may be installed on a general purpose computer, a special purpose computer, a portable laptop computer, a network computer, a mobile device like a smartphone, an online gaming service provision server, or a processor of a data processing device that may include other programming instructions. As such, the instructions that are implemented via processors of the data processing equipment that is capable of other programs or computer equipment create means for performing functions at each step of the flowchart or at each block of the block diagram below. To implement functions in specialized ways, the computer program instructions may be stored in memory or computer readable memory that is used in the computer equipment configured to act as the computer equipment or data processing equipment capable of other programming functions. The computer program instructions may be installed on the computer equipment or data processing equipment that is programmable. It is also possible to create processes for performing a series of operation steps on the computer equipment or data processing equipment and provide steps for implementing functions described herein at each step of the flowchart or each block of the block diagram.

Additionally, each block or each step may represent a module including executable instructions for executing certain special logical function(s), and part of a segment or code. And as in several examples, one may have to pay attention to the fact that in blocks or steps described herein, mentioned functions may occur or implemented out of a specified order.

In the example embodiment of the present invention, the user device may refer to a desktop computer, a notebook computer, a smartphone, a PDA, a mobile phone, a gaming device, etc. or any means that is configured to collect, read, process, store, and/or display data. In particular, the user device as used in the descriptions of an embodiment of the present invention is capable of executing software written in readable code, and has a function of displaying and sending to a user of the user device. In addition, if necessary, the user device may store software in itself, or may read the software along with data from the outside.

In addition, in the example embodiments described herein, the user device may include functions such as data processing functions as described above, input, output, storage, etc. and as such the user device may include, as in a general computer, CPU, mainboard, graphics card, hard disk, sound card, speaker, keyboard, mouse, monitor, USB, communication modem, or the like. The user device may include, as in a wireless smart phone, a CPU, a mainboard, a graphic chip, a memory chip, a sound engine, a speaker, a touch pad, an external connector such as a USB, a communication antenna, a communication modem for 3G, LTE, LTE-A, WiFi, and Bluetooth. One part of all kinds of the elements may be combined, but in an embodiment of the invention, one part of all kinds of the elements are combined, or the apparatus or the parts indicated as one or more the block in drawing or the detailed explanation, all kinds of the elements included in the user device as in the above independently together can mean over two functions described above. Each element alone or in combination with other elements, or part of each element may be combined with others to implement one or more functions, and in the drawings as shown in the example embodiment or in the detailed description thereof an apparatus shown as one or more blocks or the part thereof, or one or more elements that are included in the user device, parts of each elements may be combined into one to mean one or more functions.

In reference to the accompanying drawings, a method for providing guidance during a call waiting state in accordance with an embodiment of the present invention will be described below in detail.

FIG. 1 is a system block diagram of a user device (10) for providing a method for providing guidance during a call waiting state in an aspect of an embodiment of the present invention. Referring to FIG. 1, the user device (10) includes a gesture recognition unit (11), a call acceptance control unit (12), a call waiting control unit (13), a speaker unit (14), a microphone unit (15), a transmission and reception unit (16), and a content control unit (17).

First, by way of example, in the user device (10), the gesture recognition unit (11) may be a display equipped with an input button, a touch pad, a pressure sensitive type or an electrostatic type touch recognition device, as provided in a smart phone, a tablet computer or the like. In an aspect of the present invention, the user device (10) for providing a method for providing guidance during the call waiting state, in a case of a smartphone, may be provided to recognize a gesture, for example, dragging or touching a display unit of the smartphone.

Next, the call acceptance control unit (12) may be configured to control a call to be connected or blocked when receiving a call signal for the call. In the method for providing guidance during the call waiting state, in accordance with an embodiment of the present invention, the call acceptance control unit may control whether to accept or reject the call based on the gesture of a user recognized by the gesture recognition unit (11).

Next, the speaker unit (14) and the microphone unit (15) can output a reception sound or an audio, a dial tone, or the like that is necessary for a call, or receive or output a voice of the user. Further, the speaker unit and the microphone unit can input or output content information that is previously stored in the user device (10).

Next, the transmission and reception unit (16) of the user device (10) can transmit or receive data that is necessary for the call on the user device (10).

Next, the content control unit (17) can ensure that the content information can be reproduced via the display unit, etc. of the user device according to the contents selection information that is to be reproduced on the user device (10).

Figure 2:
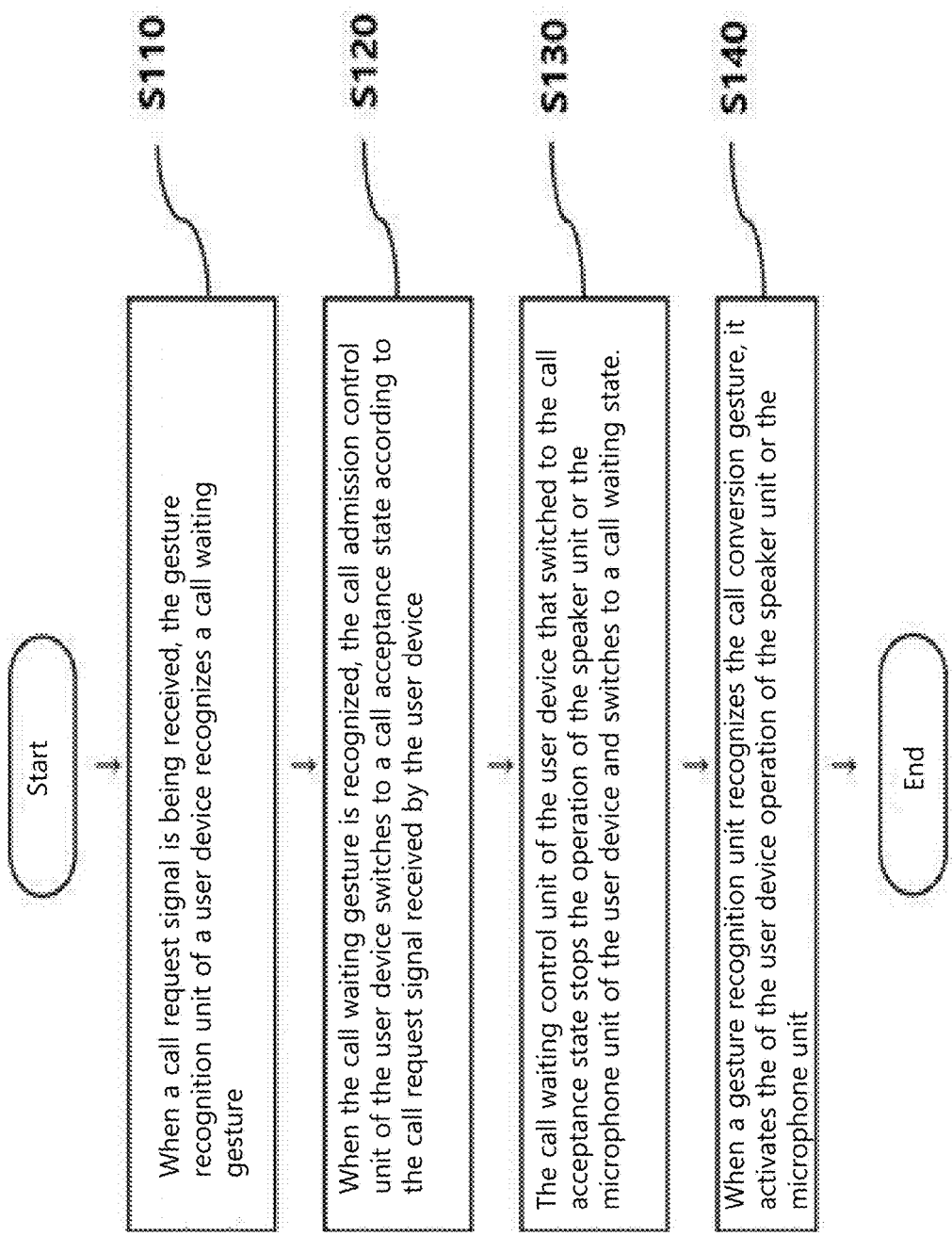
FIG. 2 is a flowchart of the method for providing guidance during the call waiting state according to an embodiment of the present invention.

FIG. 2 is a flowchart of a method for providing guidance during a call waiting state in accordance with an embodiment of the present invention. Referring to FIG. 2, first, a gesture recognition unit (11) of a user device (10) recognizes the call waiting gesture (S110) while receiving a call request signal. The user gesture may be a dragging or a touching action by a user on a touch display unit (17) of the user device (10). At this time, the call request signal may be in the form of, such as a silent signal, a vibration signal or an alarm sound signal. For example, in a case of the silent signal, when the call request signal is received in the form of a silent signal through the transmission and reception unit (16), a screen or image indicating or alerting that a call request signal is being received may be displayed on the touch screen of the smart phone. On the displayed touch screen, when the user inputs a gesture via a touching or a dragging, the gesture recognition unit (11) is configured to recognize the gesture, convert it into a form that the call acceptance control unit (12) of the user device (10) recognizes and transfer to the call acceptance control unit (12).

On the one hand, the step of recognizing the call waiting state may further include a step of, after the gesture recognition unit recognizes the call waiting gesture, displaying call waiting time selection information that allows at least a selection of a time for the user device to be placed in a call waiting state via the display unit of the user device. For example, if the time to be placed in the call waiting state is determined in advance and transmitted to a user device of a counterpart, the counterpart can estimate the time required for the call based on this information, and accordingly, it is possible to improve or increase a level of user understanding of the call waiting time for the call, along with user comments.

When the call waiting time information is displayed, the time selection gesture for the call waiting time selection information is selected through the gesture recognition unit. Accordingly, the call waiting control unit can transmit the content information during the time set in the call waiting state that is selected by the time selection gesture, through the transmission and reception unit of the user device. When the call is possible, the transmission of the content information may be automatically interrupted or stopped.

Next, when the call waiting gesture is recognized, the call acceptance control unit (12) of the user device (10) performs a step of switching to the call acceptance state according to the call request signal received by the user device (10) (S120). If the user inputs a call waiting gesture, according to the intention of accepting the call, based on the call request signal that is received by the user device (10), it can switch to the call acceptance state in which communication is possible. The call acceptance state based on the call waiting gesture may mean that it is placed in a telephone call state.

Next, the call waiting control unit (13) of the user device (10) that is switched to the call acceptance state stops an operation of the speaker unit (14) or the microphone unit (15) of the user device (10), and a step of switching to a call waiting state is performed (S130). For example, when a call is placed in a call state through a general call acceptance gesture, the microphone or speaker is put into operation, and a voice of the other party may be output through the speaker unit. However, in the steps described herein, since the speaker unit (14) and the microphone unit (15) are each in an operation-stopped state, even in the telephone conversation state, it is possible to prevent the other party's speech from being outputted through the speaker unit (14) when the device is in a quiet library or the like. In addition, since a conversation in a meeting place is not transmitted to the other party, it is possible to accept a call in a place where certain confidentiality is desired.

Also, the step of switching to the call waiting state may further include controlling of the call waiting control unit (13) to transmit content information for a time period set in the call waiting state through the transmission and reception unit (16) of the user device (10).

That is, based on the call request signal, at a user device of the counterpart (20), instead of inputting and/or outputting data through the microphone unit (15) or the speaker unit (14) of the user device (10), prepared content in advance by the user device (10) may be provided. At this time, the content information may be provided in the form of text information, audio information, or image information.

On the other hand, the content information may be information stored in advance in a data storage unit of the user device (10). At this time, the provided content is delivered to the other party as a voice message (or a video message) indicating that the other party should wait for a short period of time without hanging up a telephone call, and the other party receives the content provided by the user, while the call is not disconnected, so that the other party remains connected. As a result, the present invention is very useful not only for office workers who may have many meetings, salespeople whose communications with others may be important, students who may frequently visit university libraries, but also for government officials with hierarchical relationships, as a tool for implementing a "manner waiting mode", and it enables one to avoid missing important phone calls.

Figure 3:
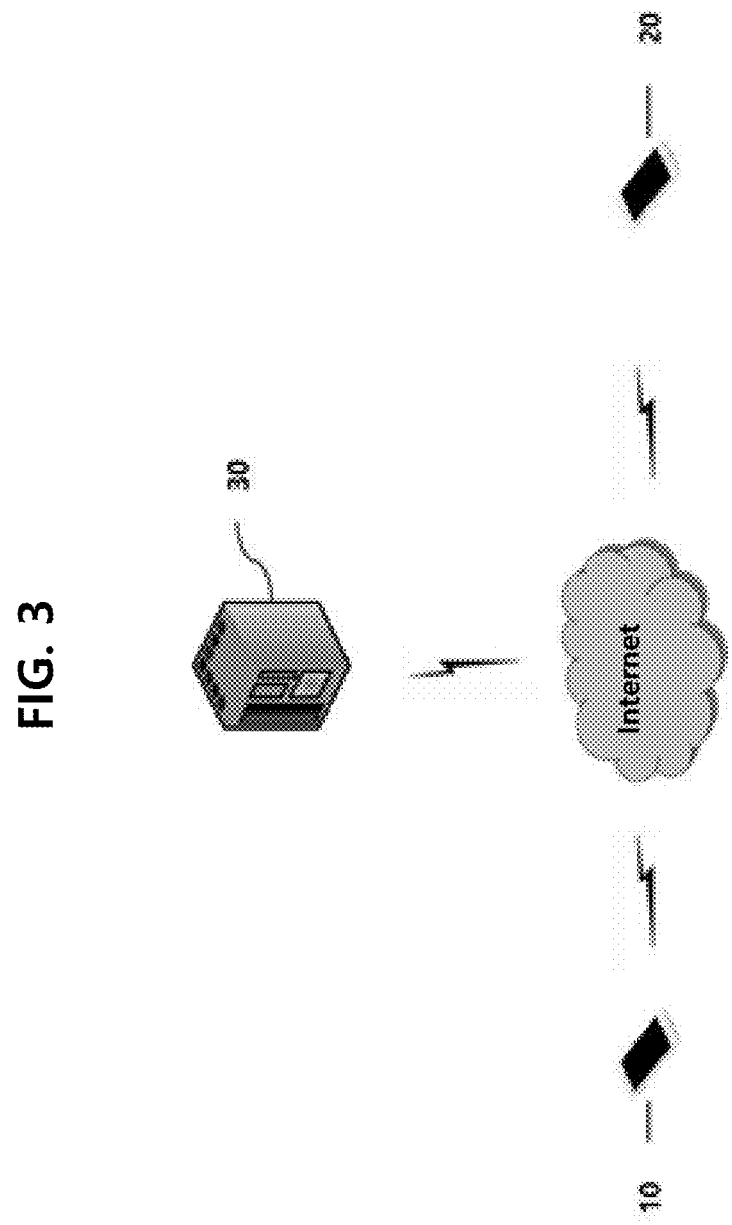
FIG. 3 is a conceptual system diagram in accordance with a method for providing guidance during a call waiting state according to an embodiment of the present invention.

FIG. 3 is a conceptual diagram showing a system for providing guidance during a call waiting state in accordance with a preferred embodiment of the present invention. In reference to FIG. 3, the content information may include advertisement, living information, or user inputted information, and the content information may be received from an external server (30). For example, in the step of switching to the call waiting state, a request signal for the content information may be transmitted to a third party service server (30) (not shown) through the transmission and reception unit (16) of the user device (10). The third party server (30) may provide to a device that transmitted the request signal certain information such as short humor and living information (weather, news, neighboring shop information, and the like) for viewing on the device. Thus, through this, it is possible not only to do marketing through providing the advertisement to the other party of the call, but also to entertain the other party alleviating the boredom.

On the one hand, the method in accordance with an aspect of the present invention can be implemented as a computer-readable code on a computer-readable recording medium. The computer-readable recording medium includes all kinds of recording apparatuses and mediums in which data that can be read by a computer system is stored. Examples of the computer-readable recording medium include a ROM, a RAM, a CD-ROM, a magnetic tape, a floppy disk, an optical data storage device, and the like, and a carrier wave (for example, transmission via the Internet). The computer-readable recording medium may also be implemented as being distributed over a networked computer system so that the computer readable code can be stored and executed in a distributed manner.

Next, when the gesture recognition unit (11) recognizes the call conversion gesture, a step of activating an operation of the speaker unit (14) or the microphone unit (15) is performed (S140). For example, when the user with the user device (10) (e.g., a smartphone) moves to a place where the user can talk with the other party and the call transitions into a callable state, the user can input a user's call conversion gesture by touching or dragging to the touch recognition unit of the smartphone. Through this, the speaker unit (14) or the microphone unit (15) is placed into an operating state, and the speech of the other party can be outputted through the speaker unit of the smartphone. In addition, through the microphone unit (15), the user of the smartphone can input content that can be delivered to the other party, such as the user's voice.

Since it is unnecessary to further transmit the content information once the call conversion gesture is recognized, the step of activating the operation of the speaker unit (14) or the microphone unit (15) may further include blocking or stopping the transmission of the content information.

Figure 4:
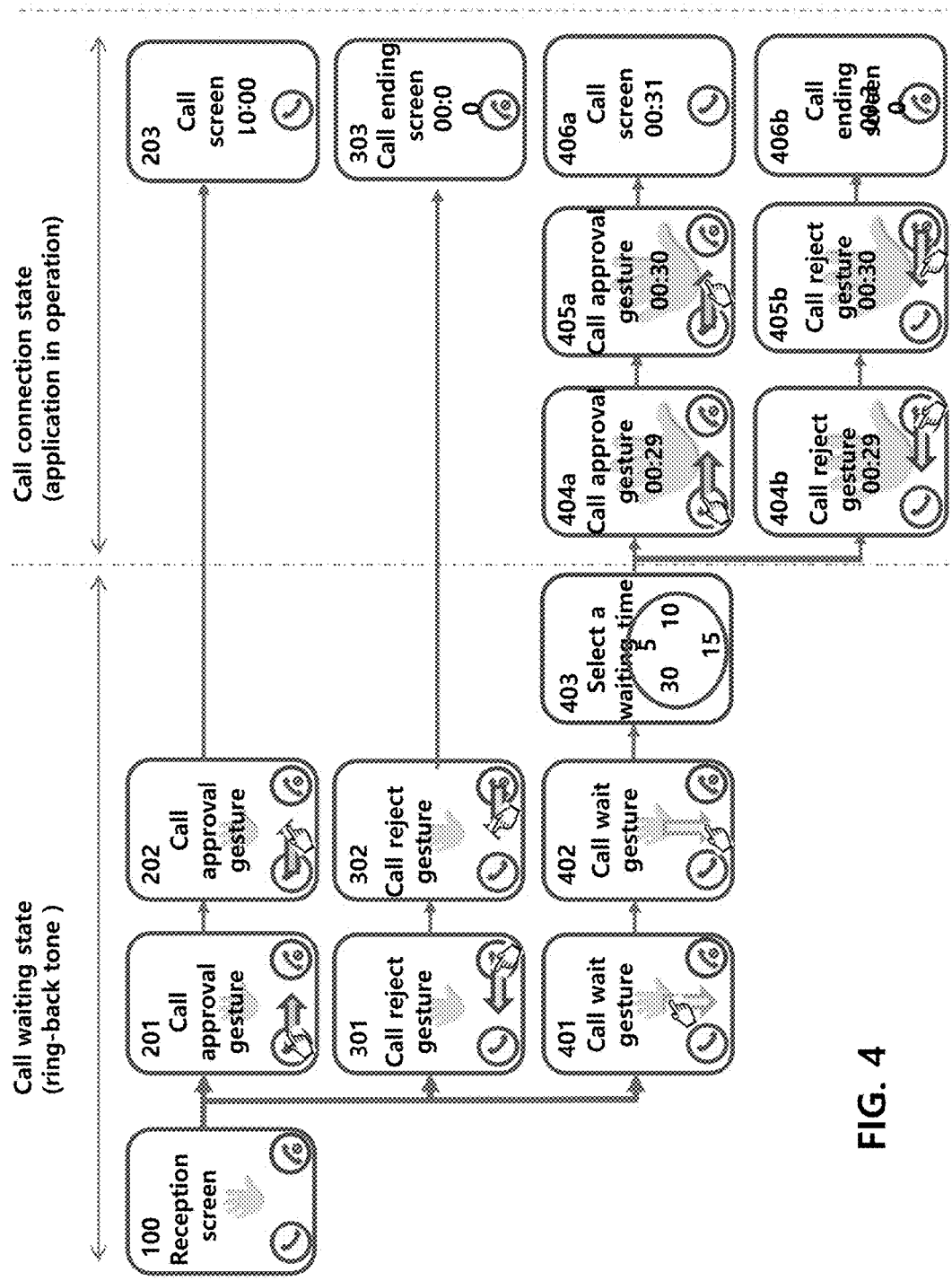
FIG. 4 is an example diagram of the method for providing guidance during a call waiting state according to an embodiment of the present invention.

FIG. 4 is another example diagram showing a method for providing guidance during a call waiting state in accordance with an aspect of the embodiment of the present invention. FIGS. 5 through 9 are examples diagrams showing portions of FIG. 4 and FIGS. 1-5. In reference to FIGS. 4 to 9, a method for providing guidance during a call waiting state in accordance with an embodiment of the present invention will be described herein.

Figure 5:
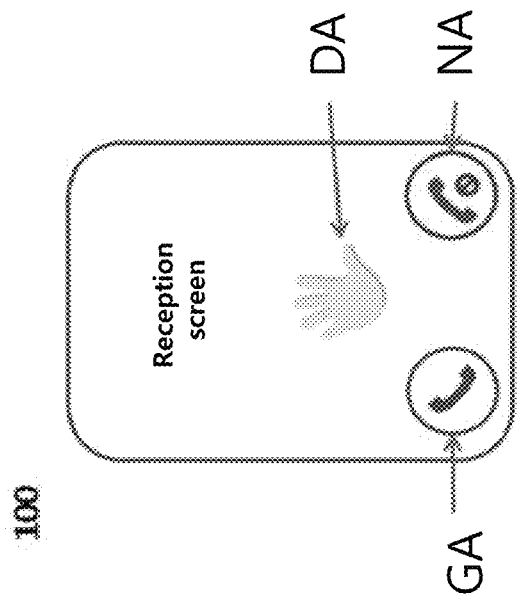
FIG. 5 is a first partial conceptual diagram showing an example diagram according to FIG. 4.
Figure 6:
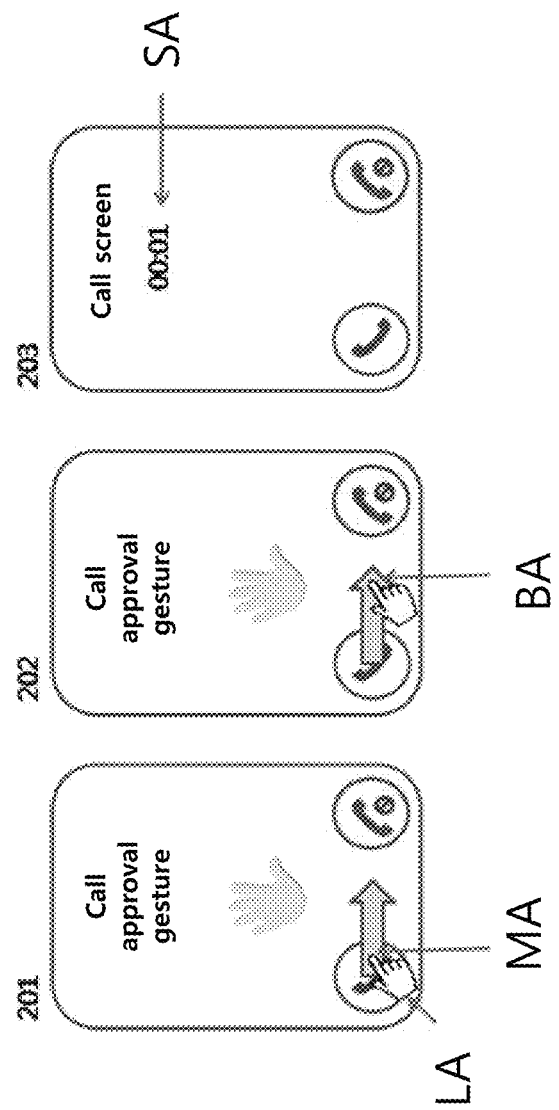
FIG. 6 is a second partial conceptual diagram showing the example diagram according to FIG. 4.
Figure 7:
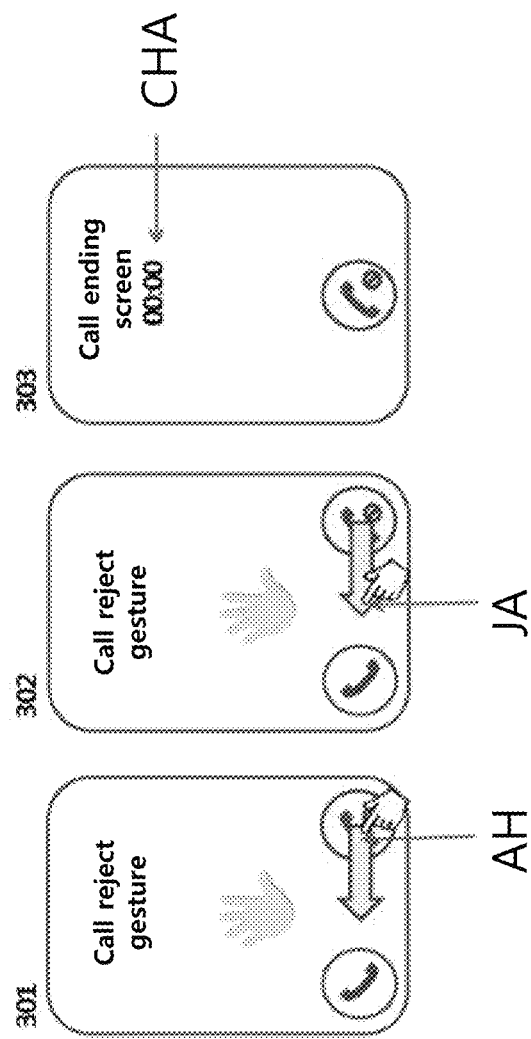
FIG. 7 is a third partial conceptual diagram showing the example diagram according to FIG. 4.

FIG. 4 conceptually shows a process in which a smartphone having a touch display unit (17) responds after receiving a call signal. When a user device (10), i.e., the mobile terminal receives the call signal, as shown in FIG. 5, displays a call reception screen preset in advance on a display screen (100), and analyzes the call signal to display caller information in graphic and text formats. The user touches and drags a 'call(GA)' or 'end(NA)' image on the display screen (100) displayed on the touch screen according to whether the call is to be accepted or it is possible. The user performs a gesture action that is predetermined (see FIGS. 6 and 7) to accept or reject the call.

Figure 8:
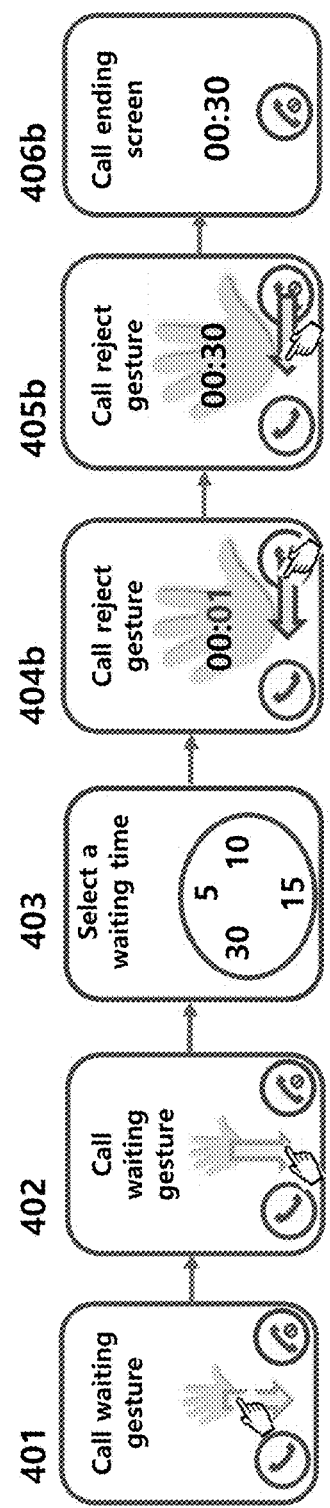
FIG. 8 is a fourth partial conceptual diagram showing the example diagram according to FIG. 4.
Figure 9:
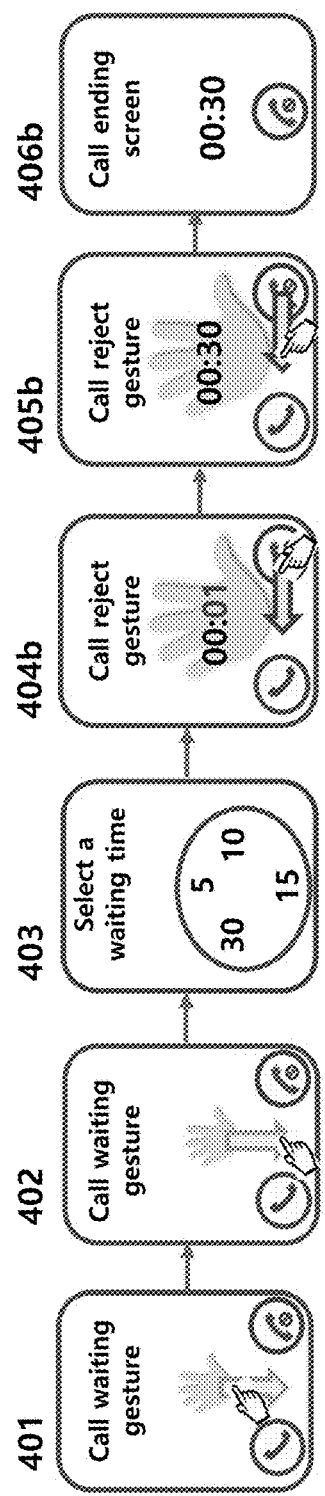
FIG. 9 is a fifth partial conceptual diagram showing the example diagram according to FIG. 4.

In reference to FIGS. 8 and 9, an image for a call waiting gesture having a palm shape is created and displayed (KA) on the touch display unit (17). When the user touches the image and moves the cursor downward (TA), it is placed in a state of having a call, as well as in a call waiting state, waiting for input from the user as to a call conversion gesture (MA, BA) or a call reject gesture (AH, JA).

In accordance with an aspect of the present invention, a method for selecting a call waiting content may include a step of receiving a call waiting signal through a transceiver of a user device, a step of recognizing a call waiting menu selection gesture by a gesture recognition unit of a user device; a step of sending call waiting menu selection information by a transmission and reception unit when the call waiting menu selection gesture is recognized, a step of receiving call waiting content at the transmission and reception unit, a step of stopping or halting an operation of a microphone unit by a content control unit of the user device and recreating the call waiting content via a speaker unit or a display unit of the user device, and a step of controlling such that the speaker unit or the display unit stops an operation of recreating the content and outputting the call information, as well as activating the operation of the microphone unit by the content control unit of the user device, when the transmission and reception unit of the user device receives call start information.

The call waiting signal may include information indicating that the call is in a call waiting state to the caller or calling party, after a party at a receiver side accepts the call. The user device that received the call waiting signal can display a call waiting menu via the display unit. Next, when the user inputs a call waiting menu selection gesture, the gesture recognition unit of the user device can recognize the gesture of the user.

When it is in a call waiting state as selected by the gesture of the user, information including the content that is desired to be reproduced at the user device is sent to the user device of the call receiving party. This information may be included in the call waiting menu selection information that is transmitted.

Next, the transmission and reception unit of the user device receives the call waiting content that is received from the user device of the call receiving party or received from a third party service server. To recreate the call waiting content, the content control unit halts the operation of the microphone unit of the user device, and controls to activate the speaker unit or the display unit.

On the one hand, the step of receiving the call waiting signal may further include, a step of displaying the content selection information by the content control unit such that a least one call waiting menu is selected by the user through the display unit of the user device, after the transmission and reception unit receives the call waiting signal, a step of recognizing a content selection gesture relating to the content selection information by the gesture recognition unit, and a step of controlling the content control unit to transmit the content request information that is selected by the content selection gesture through the transmission and reception unit.

By way of example, in a case where code for a call waiting content selection method, in accordance with an embodiment of the present invention, is implemented on a caller-side user device, in an upper portion of a display unit of the caller-side user device, information about how long it has left for waiting for a call, and an icon for a user guidance notice and other content, for example, whether to view advertisement, can be displayed. Other content may also be displayed. For example, an icon may be displayed to select whether to view the advertisement.

Figure 10:
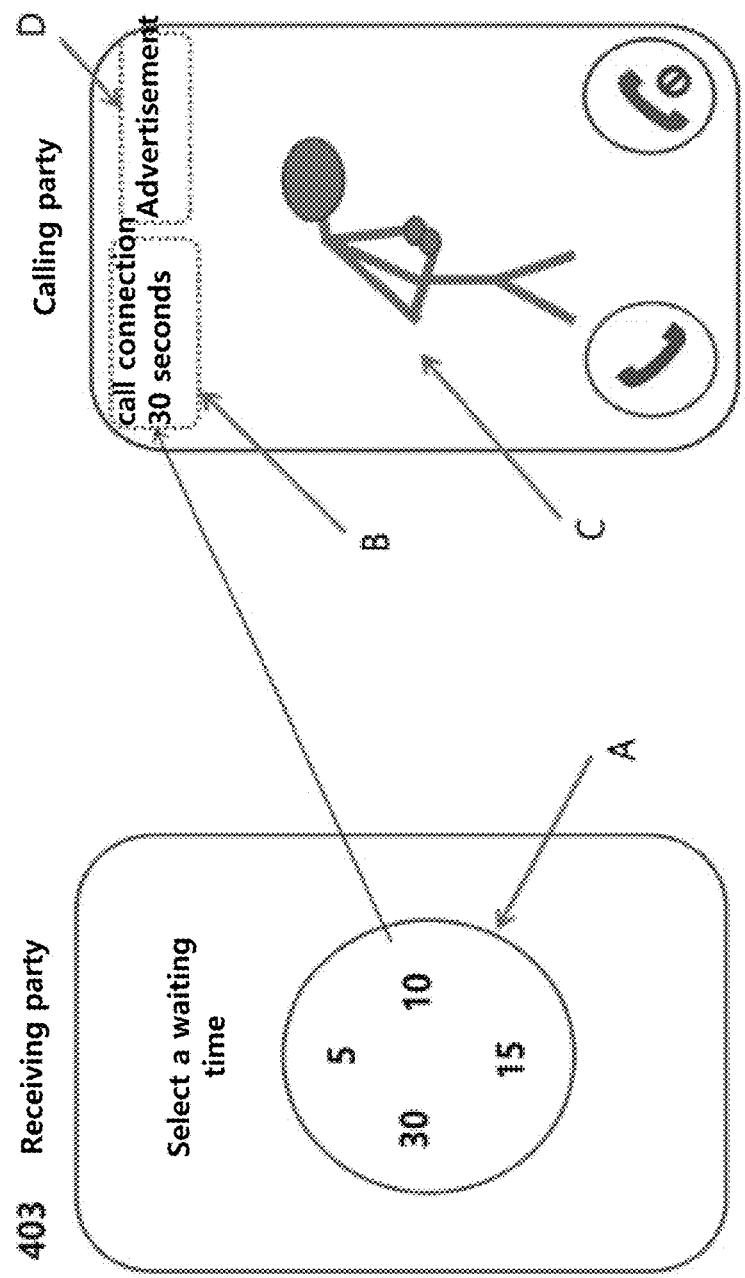
FIGS. 10 and 11 are first and second example diagrams of a selection method for the content of the call waiting state according to an embodiment of the present invention.
Figure 11:
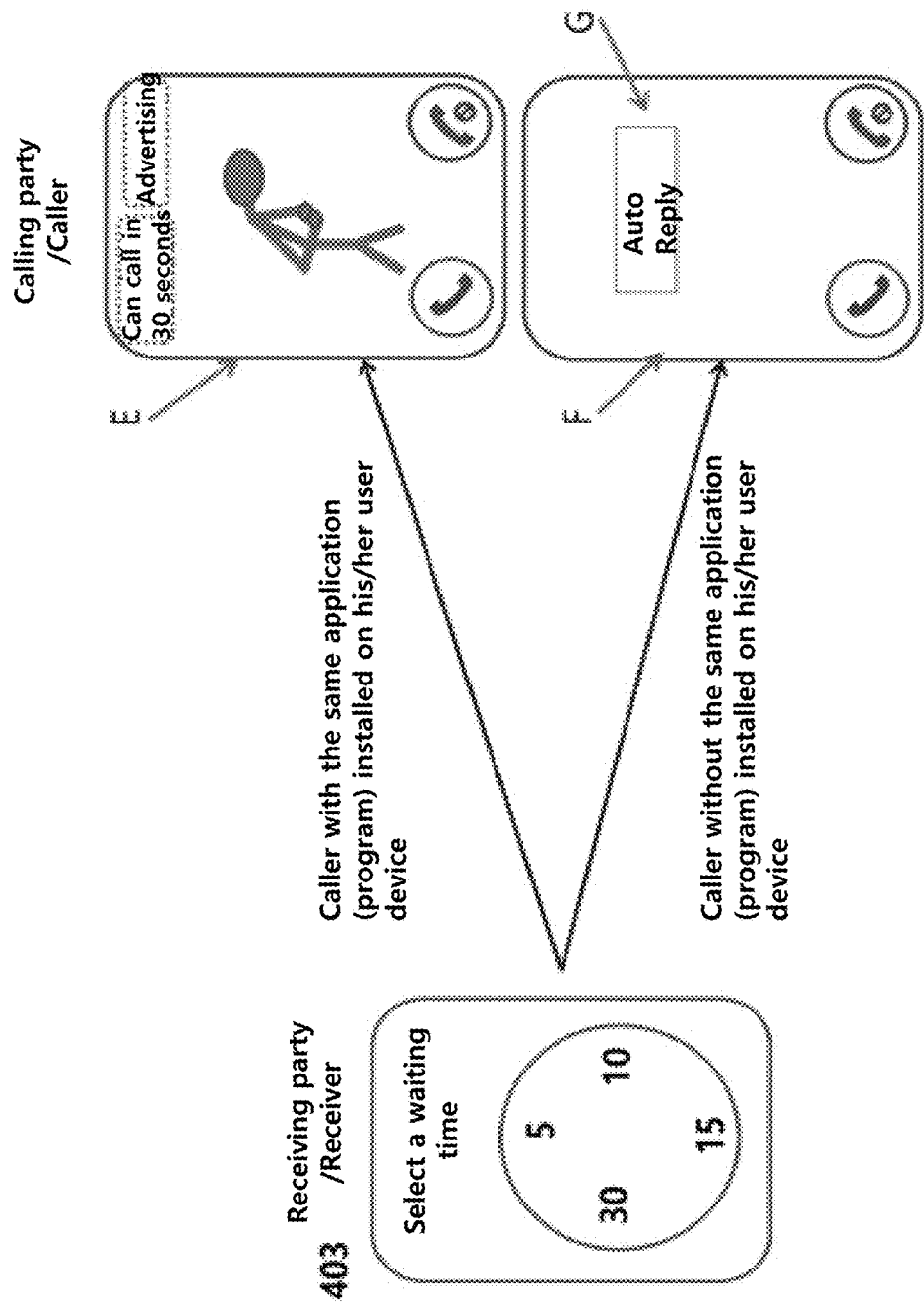

Referring to FIGS. 10 and 11, the caller-side user device (caller screen, E), in which the code for the call waiting content selection method is implemented in accordance with an embodiment of the present invention, displays (B) an inputted time (A) that the call receiving party indicated as a needed time for call waiting, an image (C) that is transmitted from a user device of the call receiving party or from a third party service server. Further, the caller-side user device may display a selection icon (D) for allowing reproduction of the advertisement. In the case of a user device in which an application for a call waiting content selection method, in accordance with an exemplary embodiment of the present invention, is installed or implemented, a selection menu allowing waiting time information indicating a status of a call receiving party or a selection menu for selecting an advertisement (call waiting content) may be displayed on the display unit such that the content suitable for a sending party can be selected.

On the other hand, in a case of a user device (F) in which the code for the content selection method, in accordance with the embodiment of the present invention, is not installed in a user device of a calling party, a message (G) such as 'auto reply' is displayed on the display unit. At the same time, notice or images for announcement information that is sent by a user device of the receiving party or third-party service server can be automatically reproduced through a display unit or a speaker unit at a screen of the user device.

The specification and the drawings disclose preferred embodiments of the present invention. Although specific terms have been used, they are just used in a general sense to facilitate description of subject matter of the present invention and facilitate understanding aspects of the present invention. It is not intended to limit the scope of the present invention. Those skilled in the art will understand that other modified examples or variations based on the technical ideas of the present invention presented herein are feasible, in addition to the example embodiments disclosed.

The invention claimed is:

1. A method for providing guidance to a user of a mobile device during a call waiting state, the method comprising: recognizing a call waiting gesture of the user by a gesture recognition unit of the mobile device, while receiving a call request signal for a call with from a calling party; when the call waiting gesture of the user is recognized by a call admission control unit of the mobile device, switching to a call acceptance state of the mobile device, according to the call request signal received by the mobile device; displaying, on a display unit of the mobile device, call waiting time selection information to allow a selection by the user of at least a time for the call to be in a call waiting state: recognizing; by the gesture recognition unit of the mobile device, a time selection gesture of the user relating to the call waiting time selection information, and receiving a time selected by the user for the call waiting state; upon recognition of the time selection gesture of the user, stopping an operation of a speaker unit or a microphone unit of the mobile device and sending an advertisement to a mobile device of the calling party during the time of the call waiting state that is selected by the time selection gesture of the user; and automatically activating the operation of the speaker unit or the microphone unit of the mobile device, when a call conversion gesture of the user is recognized by the gesture recognition unit of the mobile device for a call conversation.

2. The method according to claim 1, wherein automatically activating the operation of the speaker unit or the microphone unit of the mobile device further includes stopping the transmission of the advertisement.

3. The method according to claim 1, wherein the call waiting gesture of the user comprises a dragging or touching by the user on the display unit of the mobile device.

4. The method of claim 1, wherein sending an advertisement to a mobile device of the calling party during the time of the call waiting state includes:
  transmitting by the mobile device a content information request signal for the advertisement over a network to a service server configured to store a plurality of advertisements;
  receiving, at the mobile device of the calling party, the advertisement from the service server over the network; and
  displaying, at the mobile device of the calling party, the advertisement received from the service server.

5. The method according to claim 1, wherein the the advertisement comprises pre-stored advertisement in a data storage unit of the mobile device or in a service server over a network.

6. The method according to claim 1, wherein the advertisement comprises a product or service advertisement, user promotion or living information.

7. The method according to claim 1, wherein the advertisement comprises text, audio, image or any combinations thereof.

* * * * *